US007936304B2

(12) United States Patent
Barnard et al.

(10) Patent No.: US 7,936,304 B2
(45) Date of Patent: May 3, 2011

(54) METHOD AND SYSTEM FOR ISOLATING AND REDUCING GRATING LOBE INTERFERENCE

(75) Inventors: Thomas J. Barnard, Liverpool, NY (US); Thomas M. Canavan, Syracuse, NY (US)

(73) Assignee: Lockheed Martin Corporation, Bethesda, MD (US)

(*) Notice: Subject to any disclaimer, the term of this patent is extended or adjusted under 35 U.S.C. 154(b) by 97 days.

(21) Appl. No.: 12/267,429

(22) Filed: Nov. 7, 2008

(65) Prior Publication Data

US 2010/0117905 A1 May 13, 2010

(51) Int. Cl.
*G01S 3/16* (2006.01)
*H01Q 3/00* (2006.01)

(52) U.S. Cl. ......................... 342/380; 342/382; 342/373

(58) Field of Classification Search .................... 342/81, 342/154, 368, 372, 373, 380, 381, 382
See application file for complete search history.

(56) References Cited

U.S. PATENT DOCUMENTS 4,495,502 A * 1/1985 Masak .......................... 342/380
4,937,584 A * 6/1990 Gabriel et al. ................ 342/378
5,652,591 A * 7/1997 Liu et al. ....................... 342/380

* cited by examiner

*Primary Examiner* — Dao L Phan
(74) *Attorney, Agent, or Firm* — Howard IP Law Group, PC

(57) ABSTRACT

This invention relates to the use of a sufficiently-sampled auxiliary array in combination with one or more under-sampled sub-arrays. The sufficiently-sampled auxiliary array is used to create a signal-free reference (SFR) beam that contains grating lobe interference. The SFR may be used to cancel the interfering grating lobe in an under-sampled main beam by coherently eliminating or subtracting the SFR from the main beam. Exemplary aspects of the invention thus support significant under population of the full aperture and avoid the problems and limitations of previous solution, with consequent savings in sensor hardware cost and weight.

32 Claims, 8 Drawing Sheets

METHOD AND SYSTEM FOR ISOLATING AND REDUCING GRATING LOBE INTERFERENCE

FIELD OF INVENTION

This invention relates generally to the field of line array sensors and specifically to isolating and reducing grating lobe interference.

BACKGROUND

When beamforming a line array having uniformly spaced elements, grating lobes can appear if the element spacing exceeds one-half (½) of a wavelength. This effect is analogous to the aliasing that occurs when sampling time data at less than the Nyquist rate. In a narrowband sense, grating lobes introduce ambiguity. When wideband beamforming, these narrowband grating lobes smear out across bearing and raise the overall background level. This invention serves to cancel grating lobes, thus enabling operation of line arrays in a band above the ½ wavelength design frequency.

Referring to FIG. 1, a graph illustrating an exemplary beam pattern 100 associated with a line array having an under-sampled uniform element spacing, a spacing that exceeds half the wavelength associated with the design frequency of the array. As shown in FIG. 1, the beam pattern 100 comprises a main lobe 110 and an undesirable grating lobe 120. The occurrence of grating lobes such as grating lobe 120 is a well known problem in the art. Grating lobes are artifacts or a form of aliasing that result when a uniformly spaced array is operated above its half-wavelength design frequency.

Referring now to FIG. 2, graphs are shown that illustrate the problems encountered with grating lobes when broadband beamforming is carried out. Graph 200 illustrates the introduction of the grating lobe 210 as frequency increases. As can be seen in FIG. 2 the angle at which the grating lobe appears also varies as a function of frequency. Integration of this beam pattern 200 over frequency results in a broadband beam 250 with a smeared grating lobe 260 that appears as a background plateau. This smeared grating lobe 260 can mask desired signals.

Several approaches currently seek to address the grating lobe problem. The most basic approach simply involves raising the design frequency by decreasing channel-spacing over the entire array thereby raising sensor costs and processing requirements.

In another approach grating lobes are avoided by limiting the field of view and the operating frequency range. FIG. 3 illustrates beam patterns 310, 320 and 330 associated with three different steering angles of 90, 75 and 70 degrees respectively. The beam patterns 310 and 320 associated with 90 or 75 degrees shows minimal to no grating lobe interference, however when the main lobe is steered to 70 degrees a grating lobe 332 appears. The approach in this situation is simply to avoid steering beyond 70 degrees, which limits operational effectiveness in certain cases.

Referring now to FIGS. 4*a* and 4*b*, another approach for preventing grating lobes involves the use of an array with non-uniform element spacing. FIG. 4*a* illustrates a beam pattern 410 resulting from an array 420 with logarithmically-spaced array elements 430*a-n*. Grating lobe interference is avoided, however as can be higher side lobe levels are introduced.

Current methods for reducing grating lobe interference either require significant sensor hardware costs, merely attempt to avoid the problem, or introduce a host of additional problems. Improvements are thus needed to resolve these problems.

SUMMARY OF THE INVENTION

An exemplary embodiment of the invention contemplates use of a sufficiently sampled auxiliary array in combination with one or more under-sampled sub-arrays to reject grating lobe interference. The exemplary embodiment uses the smaller but sufficiently-sampled auxiliary array to create a signal-free reference (SFR) beam that only contains information from a grating lobe. In another aspect of an exemplary embodiment of the invention the SFR is used to cancel the interfering grating lobe in the under-sampled main beam by applying an estimate of the phase shift between the two and coherently eliminating or subtracting the phase-shifted signal-free reference from the main beam. Exemplary aspects of the invention thus support significant under population of the full aperture and avoid the problems and limitations of previous solutions, with consequent savings in sensor hardware cost and weight.

DETAILED DESCRIPTION

Reference will now be made in detail to the present exemplary embodiments of the invention, examples of which are illustrated in the accompanying drawings.

Figure 1:
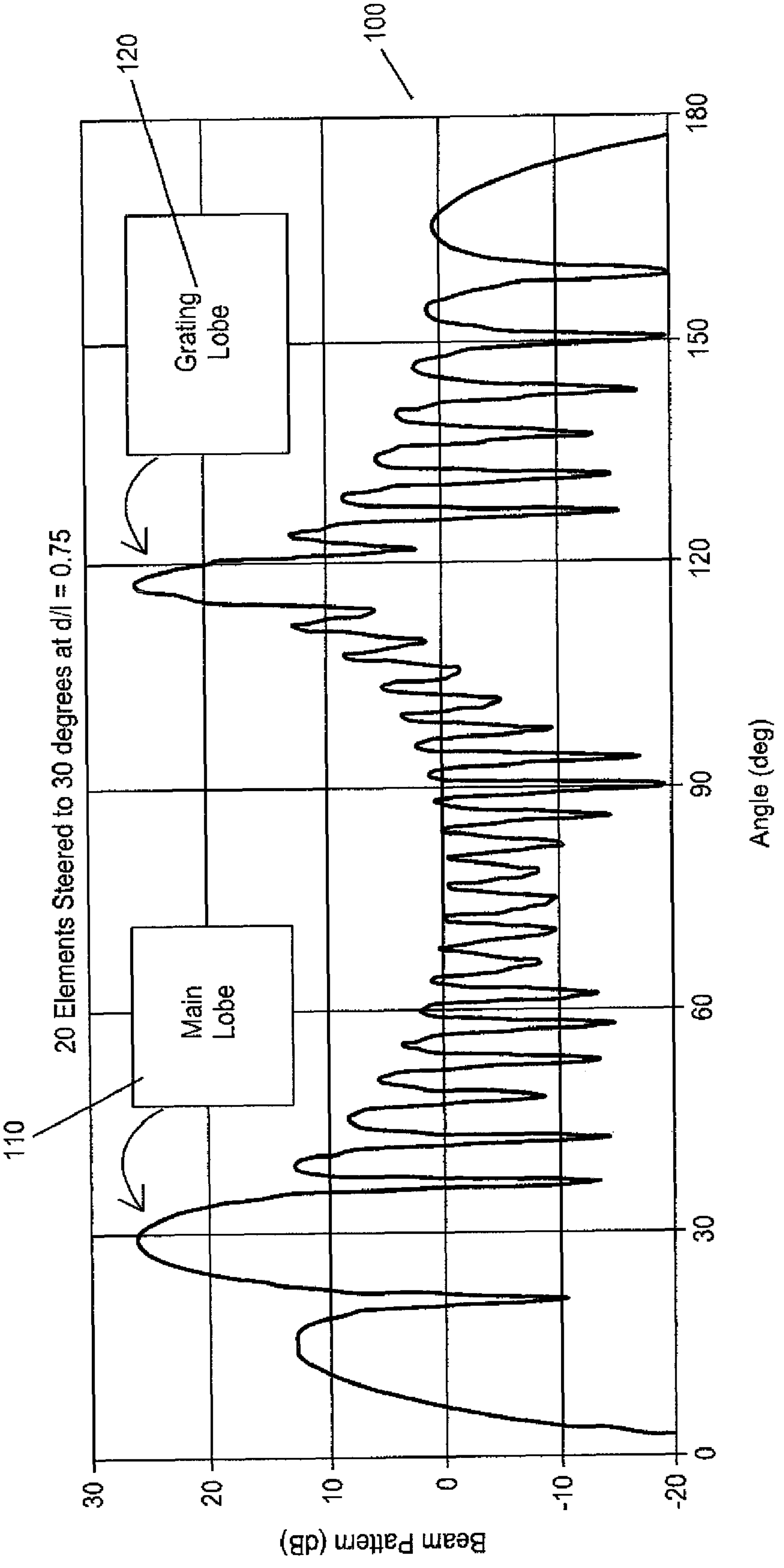
FIG. 1 is a graph illustrating an exemplary beam pattern 100 associated with a line array having an under-sampled uniform element spacing.
Figure 2:
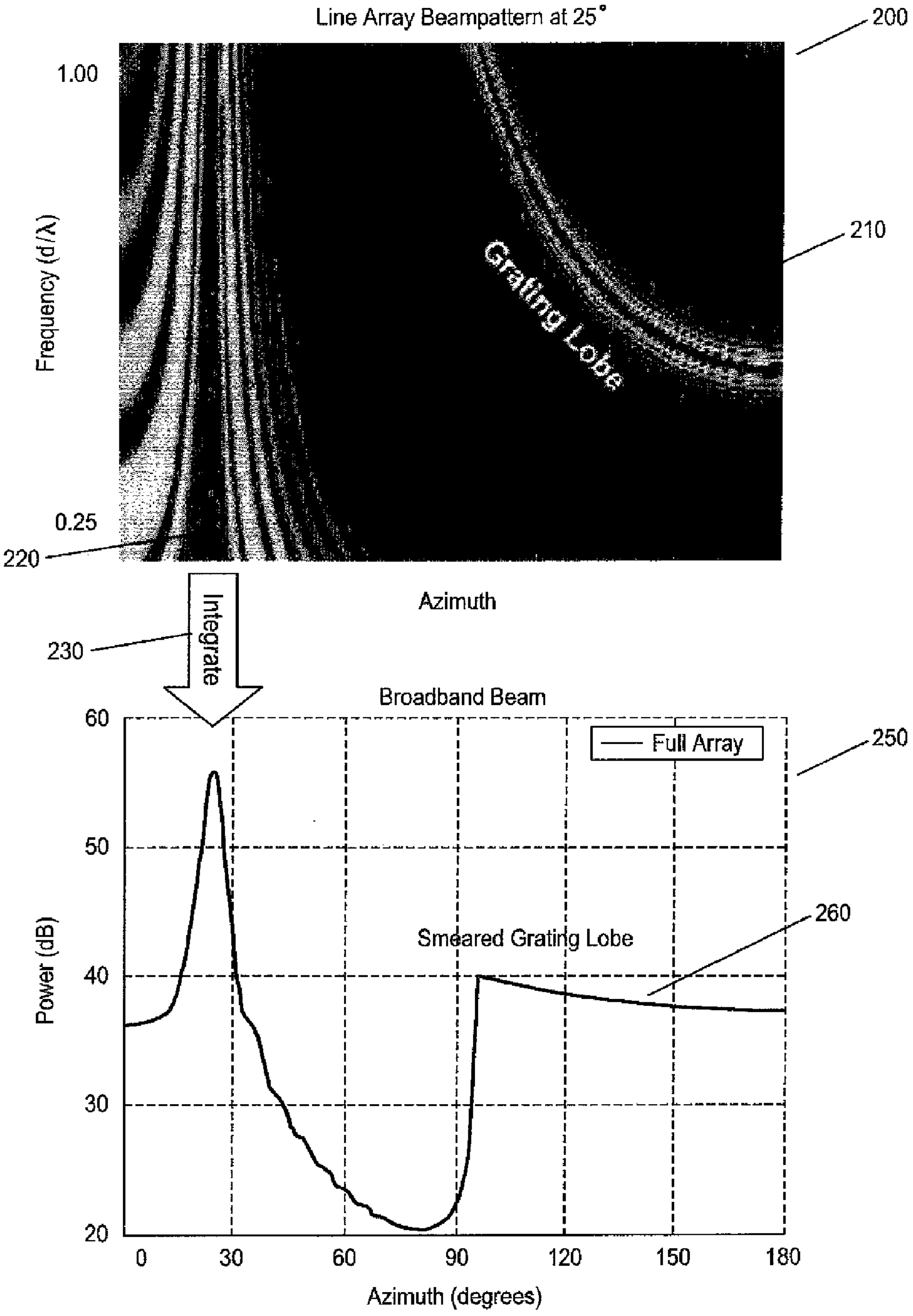
FIG. 2 is a set of graphs that illustrate the effect of grating lobe interference when broadband beamforming is carried out.
Figure 3:
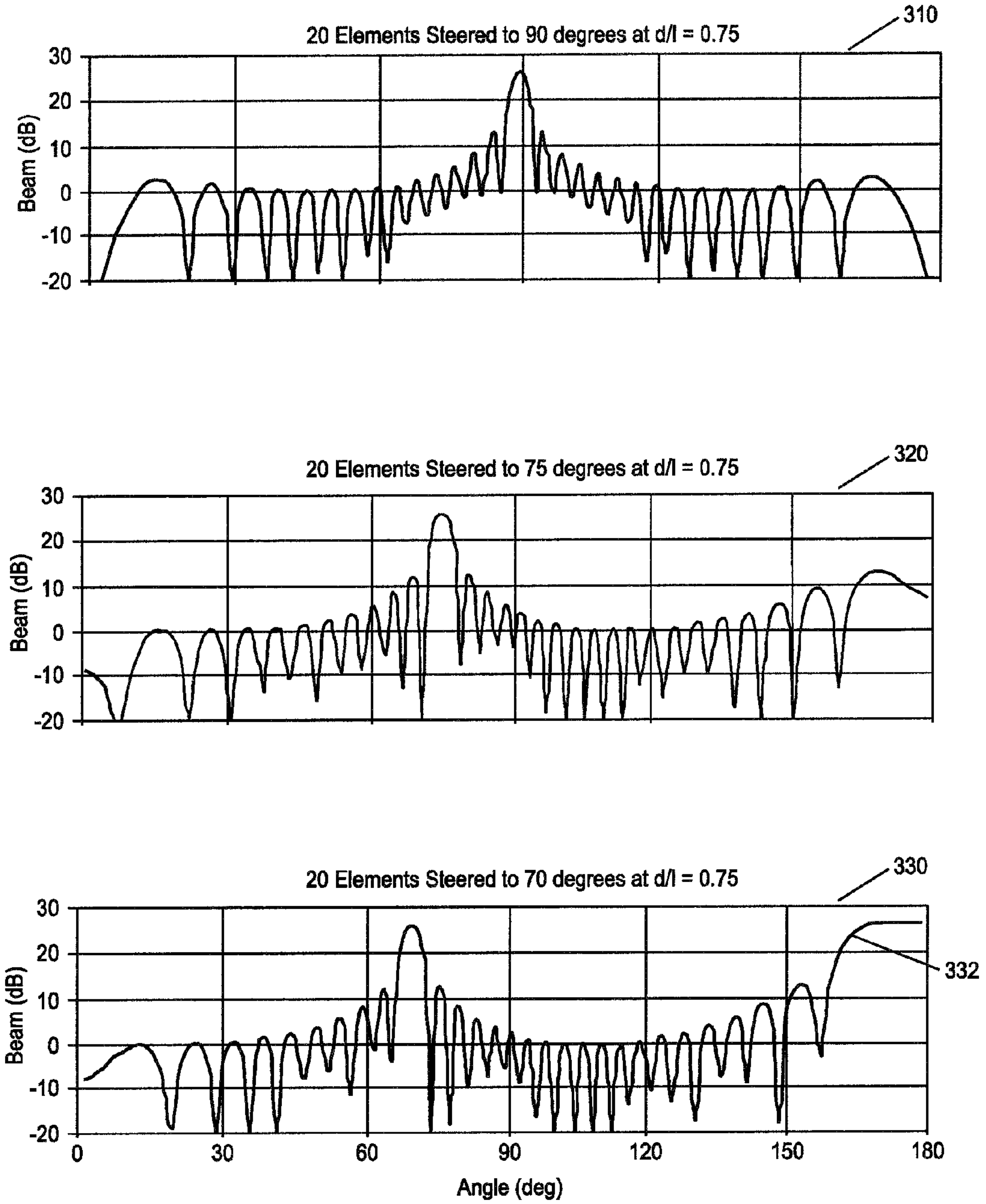
FIG. 3 PRIOR ART
FIG. 3 is a set of graphs showing beam patterns used in a prior art solution.
Figure 4A:
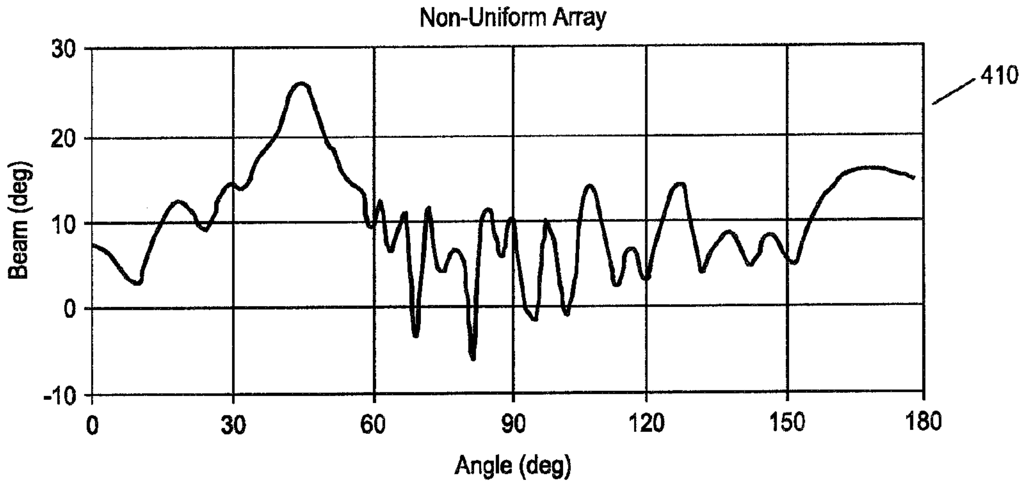
FIG. 4a PRIOR ART
FIG. 4*a* is a graph showing a beam-pattern resulting from a prior art solution.
Figure 4B:
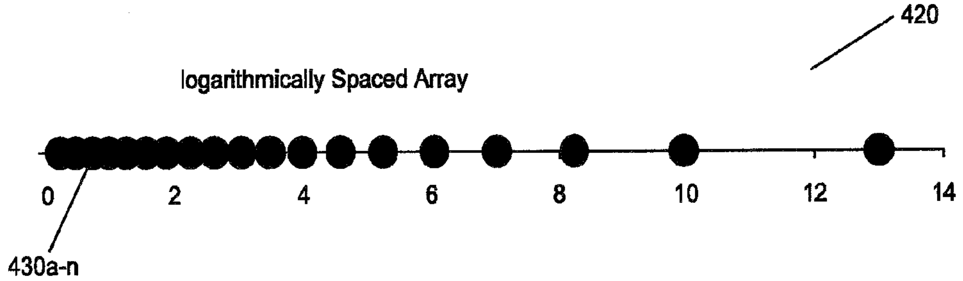
FIG. 4b PRIOR ART
FIG. 4*b* is diagram of the prior art solution that generates the beam pattern of FIG. 4*a*.
Figure 5:
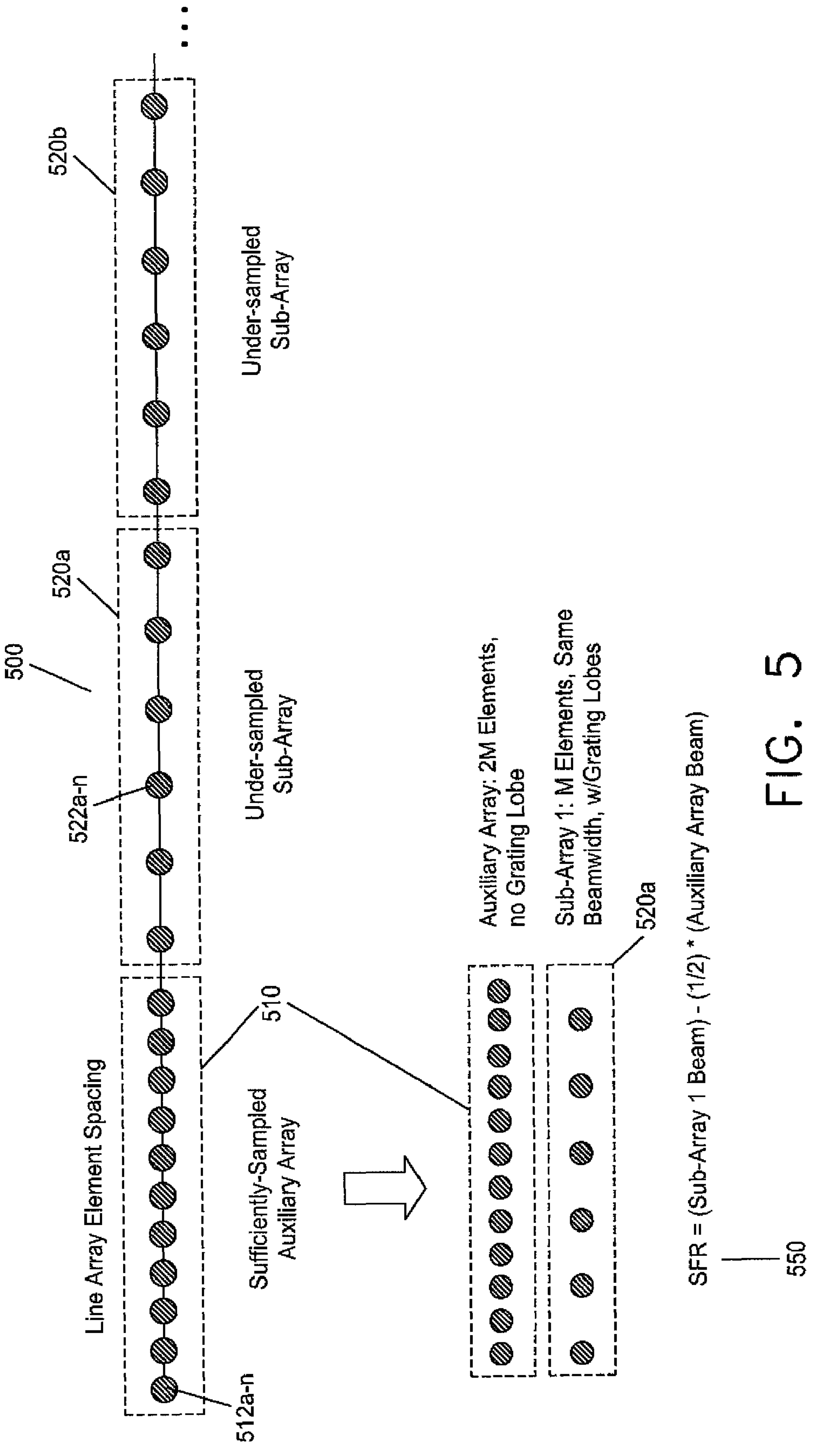
FIG. 5 is a diagram of a line array in accordance with an exemplary embodiment of the invention.

Referring to FIG. 5, a graph is shown illustrating an exemplary embodiment of the invention. A line array 500 is shown separated into an auxiliary-array 510, a first sub-array 520*a*, and a second sub-array 520*b*. While only two sub-arrays are shown it is to be understood that any number of sub-arrays may be used. The sub-arrays 520*a* and 520*b* each comprise M elements 522*a-n*. The auxiliary array 510 comprises 2M elements 512*a-n*. It is to be understood however that auxiliary array 510 may have any integer multiple of elements of the sub-arrays, depending on the desired maximum operating frequency, also known as the design frequency, of the line array 500. As shown, the first and second sub-arrays 520*a* and 520*b* have been under-sampled, meaning that their element spacing is greater that ½ the operating wavelength associated with the desired design frequency of the array 500. At certain azimuths, an under-sampled uniformly-spaced array will see grating lobes. As previously discussed, one solution is to simply sufficiently populate the entire array to increase the design frequency of the array. However, as shown in the exemplary embodiment of FIG. 5, only auxiliary sub-array 510 is sufficiently populated. This sole auxiliary array 510 will be sufficiently sampled with twice the number of elements of sub-array 520*a* or 520*b*. As a result, when the auxiliary sub-array 510 is beamformed it will not have the grating lobes that are introduced when sub-arrays 520*a* or 520*b* are beamformed at the same higher frequency. The grating lobe can then be isolated as a signal free reference (SFR) by coherently eliminating or subtracting the auxiliary-array 510 beam from the sub-array 520*a* beam in accordance with equation 550. This SFR can then be used to cancel the grating lobe interference seen when any of the additional under-sampled arrays are beamformed. This process will now be discussed in greater detail.

Figure 6:
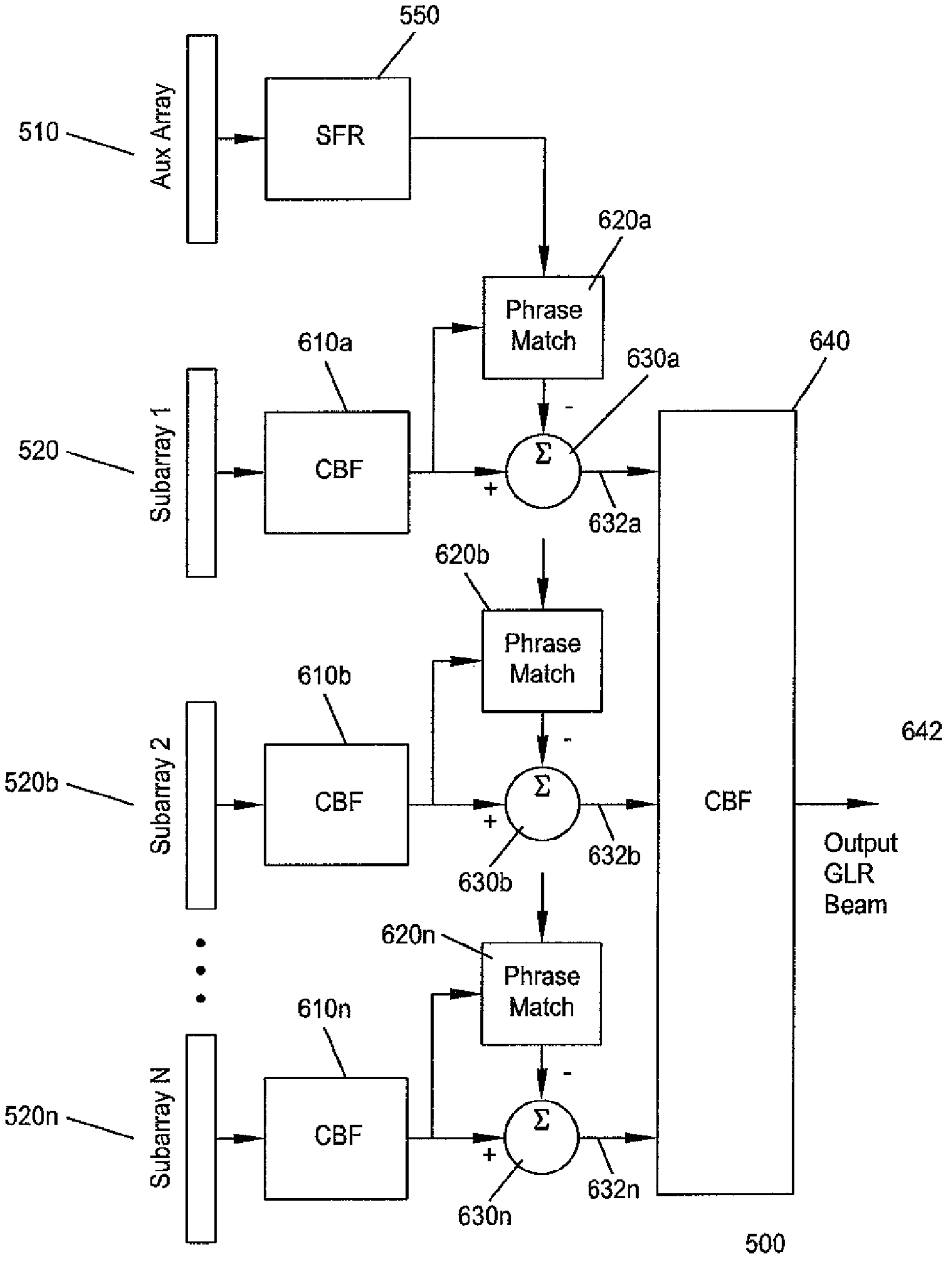
FIG. 6 is a block diagram illustrating a grating lobe rejection (GLR) process processing in accordance with an exemplary embodiment of the invention.

Referring now to FIG. 6, a block diagram illustrating a grating lobe rejection (GLR) process of an exemplary embodiment of the invention is shown. As shown, a parallel process is performed for each sub-array 520*a-n*. For each sub-array 520*a-n* a conventional beamforming (CBF) module 610*a-n* carries out a beamforming process. The output generated from each of the processes 610*a-n* is then used as input to a Phase Matching module 620*a-n* in order adjust the phase of SFR 550. Phase matching module 620*a-n* is necessary in order to perform processing to account for the phase shift introduced as a result of the spacing of the elements of the linear array 500. Each of the phase-matching modules takes as input the same SFR signal 550 and after shifting its phase for each sub-array 520*a-n* passes the output to a combining module 630*a-n*. The phase shifting performed by the phase-matching function varies linearly from sub-array to sub-array. The phase shift is a function of the location of the grating lobe which can be determined by a number of methods including performing cross-correlation between the auxiliary array 510 and each of the sub-arrays 520*a-n*. The combining module 630*a-n* will in turn coherently eliminate or subtract the phase-matched SFR from the output of each of CBF modules 610*a-n*. The result is that the grating lobe interference introduced as a result of beamforming each of the under-sampled sub-arrays 520*a-n* will be completely cancelled or rejected. This output is shown as 632*a-n*. Each of the outputs 630*a-n* are then passed through another CBF module 640 to generate the full GLR beam pattern output 642. The net effect is that the entire under-sampled array can be operated at a higher frequency without suffering from grating lobe interference and without having to increase the density of the elements.

Figure 7:
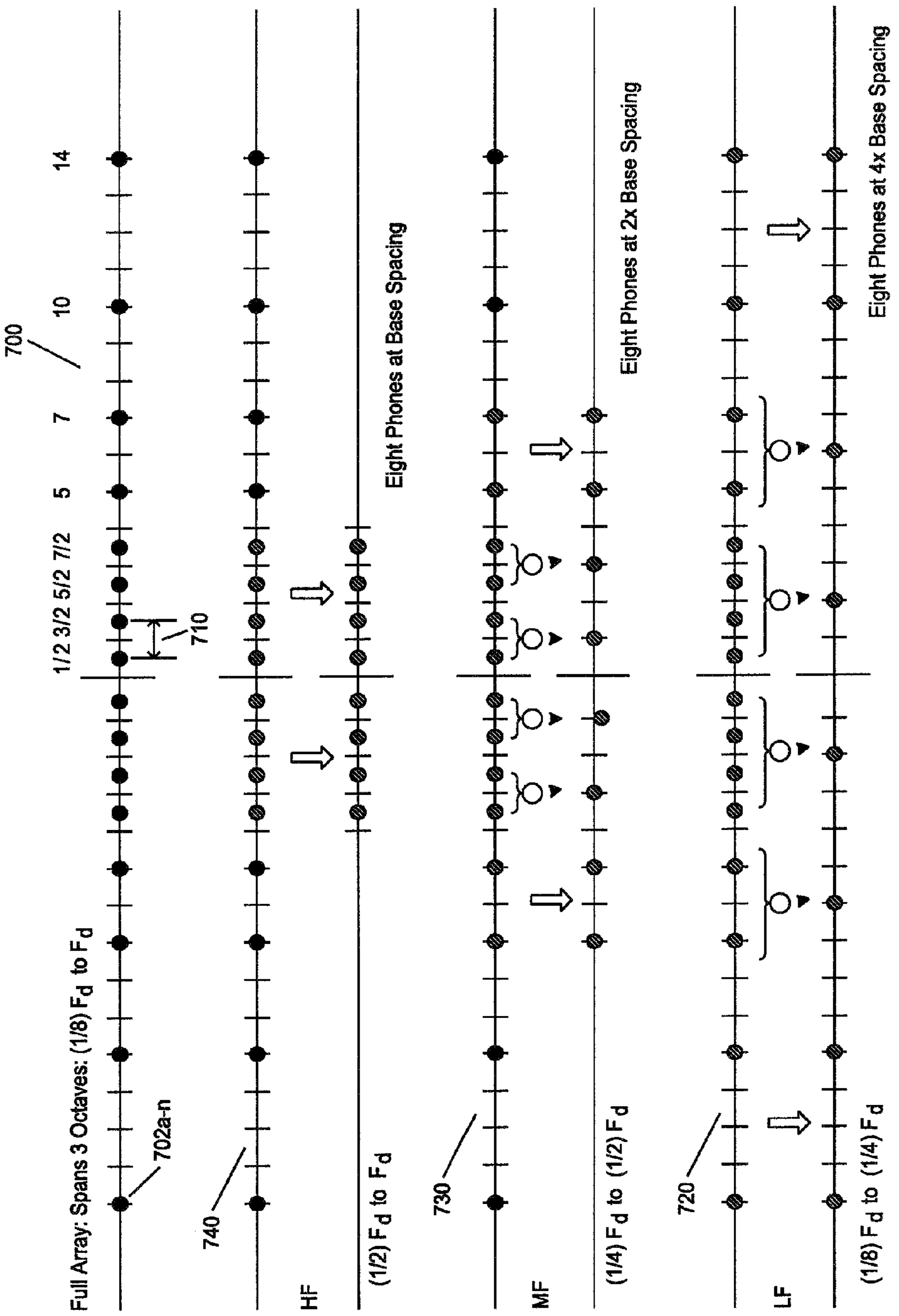
FIG. 7 PRIOR ART
FIG. 7 is a set of diagrams illustrating a conventional nested line array.

Referring now to FIG. 7, a conventional nested array 700 is shown. As shown in FIG. 7, a nested array 700 may comprise a set of array elements 702*a-n* spaced with a base spacing 710 or an interval multiple thereof. The elements 702*a-n* are selectively activated to achieve a uniform spacing with one of three different intervals. Each of the three intervals corresponds to one of three different frequency range configurations, a low frequency (LF) range configuration 720, a medium frequency range (MF) configuration 730, and a high frequency (HF) range configuration 740. As the operating frequency approaches the upper edge of a given frequency range, grating lobe interference will begin to occur and therefore the activation of the elements 702*a-n* of the nested array 700 must be reconfigured such that the spacing is stepped down to jump to a higher design frequency. Each time the spacing is stepped down a subset of elements must be deactivated. As an example when stepping down from LF to MF the two outermost elements (shown as white dots) will be deactivated (shown as black dots). The design frequency increases, however an undesirable drop in gain also occurs. In an alternate embodiment of the present invention the GLR processing may be applied to nested arrays to improve the array gain or Directivity Index of the array at higher frequency ranges. Instead of deactivating certain elements the same SFR processing described above can be applied to allow the outer under-sampled portions of the array to remain active without seeing the grating lobe interference that would normally occur.

Figure 8:
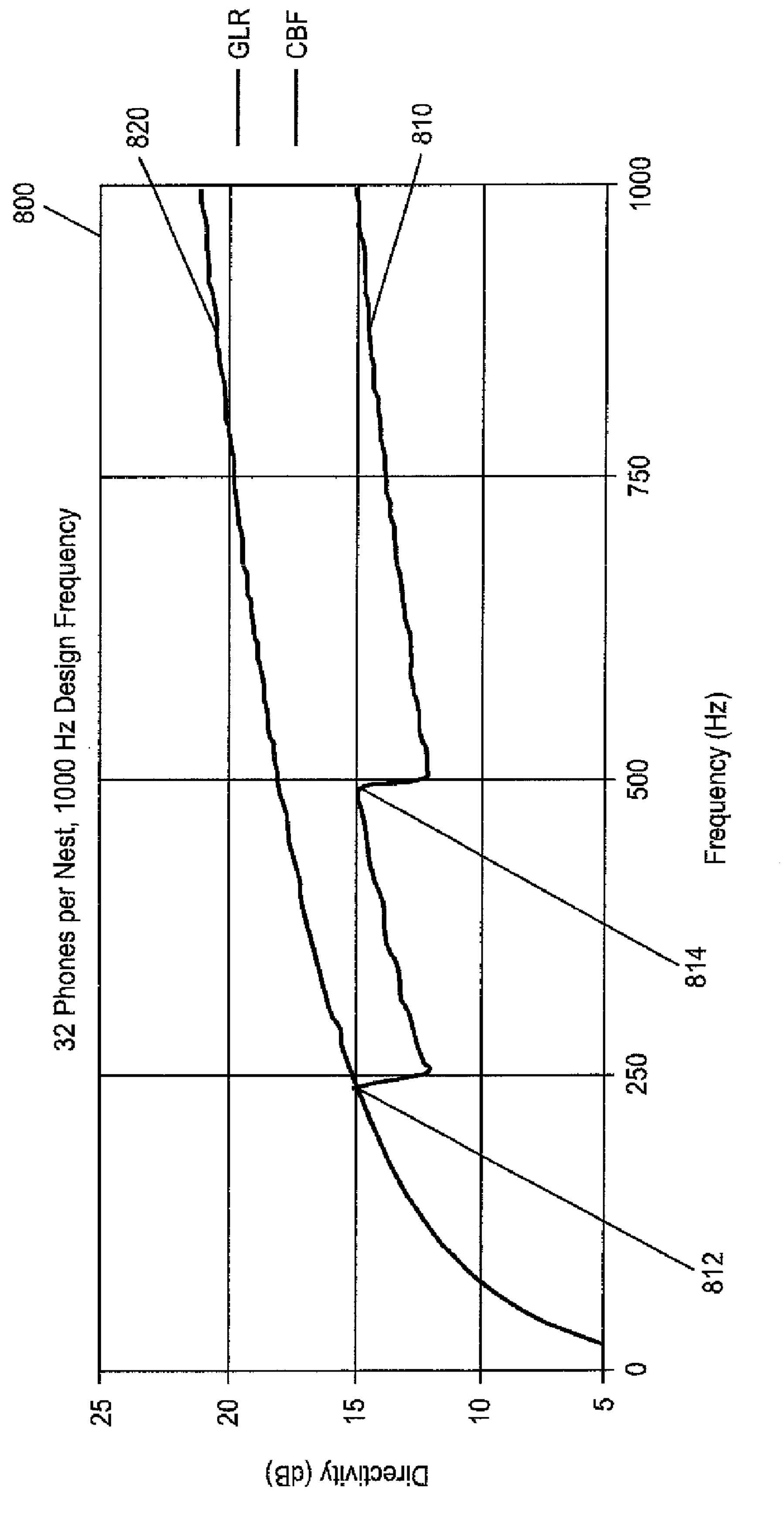
FIG. 8 is a graph illustrating directivity vs. frequency using GLR for a nested array in accordance with an exemplary embodiment of the invention compared with conventional beam forming (CBF).

Referring now to FIG. 8, a graph 800 of the directivity versus frequency is shown which illustrates the improvement seen when applying GLR to nested arrays. As shown in FIG. 8, traditional nested array CBF 810 results in a directivity gain that drops at frequencies 812 and 814 which correspond to reconfiguration of the nested array 700 to jump to a higher design frequency. The benefit of applying GLR processing to a nested array 700 is seen in the GLR curve which realizes improved gain since all of the array elements can be utilized.

Exemplary embodiments of the present invention may be implemented using sonar or radar array elements as well as both line arrays and two dimensional arrays. In the case of a two-dimensional array a two-dimensional auxiliary sub-matrix would be overpopulated to sufficiently populate the submatrix in similar manner to the auxiliary array of the line array described above.

While the foregoing invention has been described with reference to the above-described embodiment, various modifications and changes can be made without departing from the spirit of the invention. Accordingly, all such modifications and changes are considered to be within the scope of the appended claims.

What is claimed is:

1. A system for isolating grating lobe interference, the system comprising:

one or more sub-arrays, each sub-array having a first plurality of array elements;

an auxiliary array having a second plurality of array elements wherein said second plurality of array elements is an integer multiple of said first plurality of array elements;

one or more sub-array beamforming modules for generating a sub-array beam pattern for each of said one or more sub-arrays;

an auxiliary array beamforming module for generating an auxiliary-array beam pattern for the auxiliary array;

a combining module for combining said auxiliary array beam pattern and one of said one or more sub-array beam patterns.

2. The system of claim 1, wherein said combining module further performs a coherent elimination of said auxiliary array beam pattern from one of said one or more sub-array beam patterns to generate a signal free reference (SFR) wherein said SFR includes said grating lobe interference.

3. The system of claim 1, wherein said combining module further comprises a subtraction of said auxiliary array beam pattern from one of said one or more sub-array beam patterns to generate a signal free reference (SFR) wherein said SFR includes said grating lobe interference.

4. The system of claim 1, wherein said one or more sub-array array elements and said auxiliary-array array elements are selected from one of radar array elements and sonar array elements.

5. The system of claim 1, wherein said one or more sub-array array elements and said auxiliary-array array elements are uniformly spaced.

6. The system of claim 1, wherein said one or more sub-array array elements and said auxiliary-array array elements are nested.

7. The system of claim 1, wherein said one or more sub-array array elements and said auxiliary-array array elements are arranged as one-dimensional uniformly spaced arrays.

8. The system of claim 1, wherein said one or more sub-array array elements and said auxiliary-array array elements are arranged as two-dimensional uniformly spaced arrays.

9. A system for removing grating lobe interference, the system comprising:

one or more sub-arrays, each having a first predetermined plurality of array elements;

an auxiliary sub-array having a second plurality of array elements wherein said second plurality of array elements is an integer multiple of said first plurality of array elements;

one or more sub-array beamforming modules for generating a sub-array beam pattern for each of said one or more sub-arrays;

an auxiliary-array beamforming module for generating an auxiliary array beam pattern for the auxiliary array;

a first combining module for coherently eliminating said auxiliary array beam pattern from one of said one or more sub-array beam patterns to generate a signal free reference (SFR);

one or more phase-matching modules for phase-shifting said SFR to produce one or more phase-shifted SFRs for each of said one or more sub-array beam patterns;

one or more SFR combining modules for coherently eliminating said one or more phase-shifted SFRs from said one or more sub-array responses to produce one or more output responses;

wherein said SFR comprises said grating lobe interference.

10. The system of claim 9 further comprising:

an output beamformer for receiving each of said one or more output responses and combining said output response to generate a single grating lobe reduced beam pattern.

11. A system for removing grating lobe interference, the system comprising:

one or more arrays, each array having a plurality of uniformly spaced array elements;

one or more beamforming modules for generating a beam pattern for each of said one or more arrays;

one or more phase-matching modules, each of said phase-matching modules adapted to receive a signal free reference (SFR) and phase-shift said SFR for each of said one or more array beam patterns and wherein said SFR comprises a beam pattern representative of said grating lobe interference;

one or more SFR combining modules for combining said one or more phase-shifted SFRs with said one or more array responses to produce one or more output responses.

12. The system of claim 11, wherein said one or more SFR combining modules further performs a coherent elimination of said one or more phase-shifted SFRs from said one or more array responses to produce said one or more output responses.

13. The system of claim 11, wherein said one or more SFR combining modules further performs a subtraction of said one or more phase-shifted SFRs from said one or more array responses to produce said one or more output responses.

14. The system of claim 11 further comprising:

an output beamformer for receiving each of said one or more output responses and combining said output responses to generate a single grating lobe reduced beam pattern.

15. A method for isolating grating lobe interference, the method comprising the steps of:

providing one or more sub-arrays, each sub-array having a first plurality of array elements;

providing an auxiliary array having a second plurality of array elements wherein said second plurality of array elements is an integer multiple of said first plurality of array elements;

beamforming said one or more sub-arrays to generate a sub-array beam pattern for each of said one or more sub-arrays;

beamforming said auxiliary array for generating an auxiliary array beam pattern;

combining said auxiliary array beam pattern and one of said one or more sub-array beam patterns to isolate said grating lobe interference.

16. The method of claim 15 wherein said combining further comprises coherently eliminating said auxiliary array beam pattern from one of said one or more sub-array beam patterns to generate a signal free reference (SFR) wherein said SFR includes said grating lobe interference.

17. The method of claim 15 wherein said combining further comprises subtracting said auxiliary array beam pattern from one of said one or more sub-array beam patterns to generate a signal free reference (SFR) wherein said SFR includes said grating lobe interference.

18. The method of claim 15, wherein said one or more sub-array array elements and said auxiliary-array array elements are selected from one of radar array elements and sonar array elements.

19. The method of claim 15, wherein said one or more sub-array array elements and said auxiliary-array array elements are uniformly spaced.

20. The method of claim 15, wherein said one or more sub-array array elements and said auxiliary-array array elements are nested.

21. The method of claim 15, wherein said one or more sub-array array elements and said auxiliary-array array elements are arranged as one-dimensional uniformly spaced arrays.

22. The method of claim 15, wherein said one or more sub-array array elements and said auxiliary-array array elements are arranged as two-dimensional uniformly spaced arrays.

23. A method for removing grating lobe interference, the method comprising the steps of:

providing one or more sub-arrays, each sub-array having a first plurality of array elements;

providing an auxiliary array having a second plurality of array elements wherein said second plurality of array elements is an integer multiple of said first plurality of array elements;

beamforming said one or more sub-arrays to generate a sub-array beam pattern for each of said one or more sub-arrays;

beamforming said auxiliary-array for generating an auxiliary array beam pattern;

coherently eliminating said auxiliary array beam pattern from one of said one or more sub-array beam patterns to generate a signal free reference (SFR);

phase-matching said SFR by phase-shifting said SFR for each of said one or more sub-array beam patterns;

coherently eliminating said one or more phase-shifted SFRs from said one or more sub-array responses to produce one or more output responses;

wherein said SFR comprises said grating lobe interference.

24. The method of claim 23 further comprising:

beamforming each of said one or more output responses to generate a single grating lobe reduced beam pattern.

25. A method for removing grating lobe interference, the method comprising:

providing one or more arrays, each array having a plurality of uniformly spaced array elements;

beamforming said one or more arrays to generate a beam pattern for each of said one or more arrays;

receiving a signal free reference (SFR) wherein said SFR comprises a beam pattern representative of said grating lobe interference;

phase-matching said SFR for each of said arrays by phase-shifting said SFR for each of said one or more array beam patterns;

combining said one or more phase-shifted SFRs with said one or more array responses to produce one or more output responses.

26. The method of claim 25, wherein said combining further comprises coherently eliminating said one or more phase-shifted SFRs from said one or more array responses to produce said one or more output responses.

27. The method of claim 25, wherein said combining further comprises subtracting said one or more phase-shifted SFRs from said one or more array responses to produce said one or more output responses.

28. The method of claim 25, further comprising:

beamforming each of said one or more output responses to generate a single grating lobe reduced beam pattern.

29. The system of claim 1, wherein said one or more sub-arrays, and said auxiliary array are configured as a single line array.

30. The system of claim 1, wherein said one or more sub-arrays, and said auxiliary array are configured as two dimensional arrays.

31. The method of claim 15, wherein said one or more sub-arrays, and said auxiliary array are provided as a single line array.

32. The system of claim 1, wherein said one or more sub-arrays, and said auxiliary array are provided as two dimensional arrays.

* * * * *